No. 731,788. PATENTED JUNE 23, 1903.
H. F. A. KLEINSCHMIDT.
CAR COUPLING.
APPLICATION FILED APR. 22, 1902.
NO MODEL.
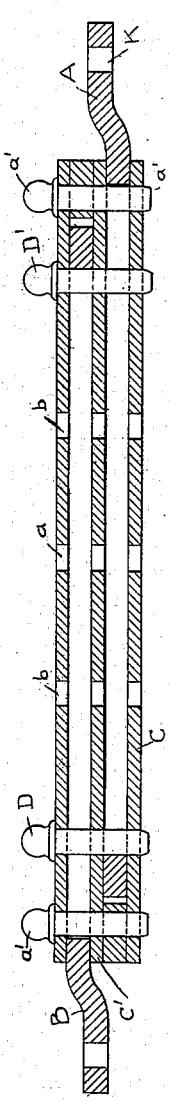
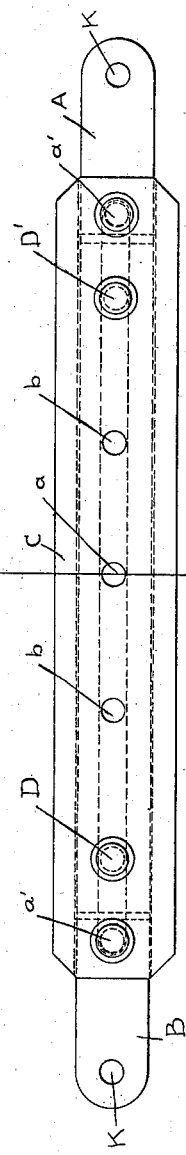
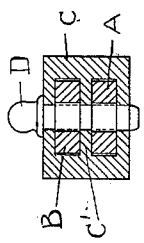
WITNESSES:
INVENTOR
H. F. A. Kleinschmidt
BY Geo. H. Parmeter,
his ATTORNEY.

No. 731,788. Patented June 23, 1903.

UNITED STATES PATENT OFFICE.

HENRY F. A. KLEINSCHMIDT, OF JOHNSTOWN, PENNSYLVANIA, ASSIGNOR TO THE LORAIN STEEL COMPANY, A CORPORATION OF PENNSYLVANIA.

CAR-COUPLING.

SPECIFICATION forming part of Letters Patent No. 731,788, dated June 23, 1903.

Application filed April 22, 1902. Serial No. 104,127. (No model.)

*To all whom it may concern:*

Be it known that I, HENRY F. A. KLEINSCHMIDT, of Johnstown, in the county of Cambria and State of Pennsylvania, have invented a new and useful Improvement in Car-Couplings, of which the following is a full, clear, and exact description, reference being had to the accompanying drawings, which form a part of this specification.

My invention has relation to car-couplings, and is designed to provide an adjustable and extensible coupling intended for use where it is necessary or desirable to vary the distance between adjacent cars.

The invention is particularly useful in connection with track-welding cars and equipments for coupling the various cars which comprise the welding equipment.

In the most approved method of electric welding now coming into use to a large extent the splice-bars are welded to the track-rails by a center and two end welds, the center weld being made first. The welding outfit consists of a number of cars, and each car, or as many of them as may be necessary, is provided with its own propelling motor or motors, and it is desirable, in order to make the several welds, to operate some of the cars independently of the others without uncoupling them or disturbing the current-conductors which run from one car to another. For instance, the welding-car should be so coupled to the succeeding car, which carries the converter and other electrical apparatus, that it may be moved independently of the latter from one weld to another, and thus avoid the necessity for starting the entire train and stopping it with the cars at exactly the right place.

My invention provides a coupling which permits independent movement of the cars within the necessary limits and which can also be so set or adjusted as to limit the movement of the car and stop it at precisely the proper point.

My invention consists, therefore, in an extensible adjustable coupling of the character described, and also in the novel construction, arrangement, and combination of parts, all as hereinafter described, and pointed out in the appended claims, reference being had to the accompanying drawings, in which—

Figure 1 is a view partly in section and partly in vertical section; Fig. 2, a top plan view, and Fig. 3 a transverse section on the line 3 3 of Fig. 2.

In the figures the letters A and B designate two overlapping slotted coupling-links, which slide in guides formed in a housing C. In Fig. 1 the coupling is shown in its position of least extension, the links A and B being held by the two pins D and D', dropped through holes in the housing and through the link-slots. By removing these pins and dropping a single pin through a central opening $a$ in the housing the links can be drawn out to their fullest extent, but will be prevented from being pulled entirely out of the housing by means of end pins $a'$, as will be readily seen. The housing is also provided with any desired number of intermediately-located pin-openings $b$, suitably spaced in accordance with the various adjustments which it may be necessary to give the work, and by inserting a short pin into one of these openings, reaching only through the upper link and into the central housing-plate $C'$, the extension of the upper link may be correspondingly limited, or this may be accomplished where but one of the cars is to be moved by a long pin inserted at any desired point through the links.

It will be readily seen that either of two cars connected by this coupling may be moved independently of the other and may be brought to a standstill by the end wall of its link-slot engaging with a properly-positioned pin. Thus in making a track-weld of the character hereinbefore referred to the welding-train may be stopped at approximately the right position with reference to the joint to be welded. The welding-car can then be independently moved to a position to make the center weld and then ahead and back to make the end welds, being stopped at the right points by the inserted pins. The openings $b$ provide for adjustment to suit varying conditions of work, such as arise where the splice-bars used in making the welded joint are not always the same length. The inner end of each link is provided with a pin-hole $k$, by means of which it is secured to the coupling-head in the usual manner.

I do not wish to limit myself to a coupling constructed in the exact manner herein shown and described, as it is obvious that various changes may be made in the details thereof without departing from the spirit and scope of my invention.

Having thus described my invention, what I claim as new, and desire to secure by Letters Patent, is—

1. A car-coupling comprising a guide, extension members connected to the cars and arranged to slide in said guide, and removable pins, or the like, having seats in the guide and engaging said members.

2. A car-coupling composed of overlapping members arranged to slide endwise one upon another to thereby vary the length of the coupling, and means whereby said movement may be controlled and stopped at a number of different points.

3. A car-coupling composed of two extension members having a sliding engagement with each other, and means whereby said movement may be controlled and stopped at a number of different points.

4. A car-coupling comprising a housing or guide, extension members arranged to slide in said housing or guide, and means for limiting the movement of the said members to definitely vary the length of the coupling.

5. A car-coupling, comprising a housing, and a pair of overlapping longitudinally-slotted links mounted to slide in guides in said housing, the latter having a number of pin-seats which register with the slots in said links.

6. A car-coupling comprising a suitable guide, slotted coupling-links seated to slide in said guide and upon each other, and means for securing said links in different relative positions.

7. The herein-described car-coupling, consisting of a guide or housing C, having pin-holes therein, the two overlapping longitudinally-slotted links A and B arranged to slide in said guide or housing, and having means for attachment to a car, and pin adapted to be seated in said pin-holes and engage the link-slots, substantially as described.

In testimony whereof I have affixed my signature in presence of two witnesses.

HENRY F. A. KLEINSCHMIDT.

Witnesses:
GEO. H. PARMELEE,
H. W. SMITH.